(12) United States Patent
Tsumoto

(10) Patent No.: US 8,217,604 B2
(45) Date of Patent: Jul. 10, 2012

(54) APPARATUS MOTOR CONTROL METHOD

(75) Inventor: Manabu Tsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 271 days.

(21) Appl. No.: 12/642,713

(22) Filed: Dec. 18, 2009

(65) Prior Publication Data

US 2010/0164417 A1 Jul. 1, 2010

(30) Foreign Application Priority Data

Dec. 26, 2008 (JP) ................................. 2008-333872

(51) Int. Cl.
*H02P 6/10* (2006.01)
(52) U.S. Cl. .................. 318/400.23; 318/268; 318/437; 318/461
(58) Field of Classification Search .................. 318/136, 318/400.23, 268, 432, 437, 461, 798, 799, 318/807, 808, 809
See application file for complete search history.

(56) References Cited

U.S. PATENT DOCUMENTS

| | | | | |
|---|---|---|---|---|
| 4,525,657 A | * | 6/1985 | Nakase et al. | 318/400.23 |
| 5,444,341 A | * | 8/1995 | Kneifel et al. | 318/432 |
| 5,469,215 A | * | 11/1995 | Nashiki | 318/432 |
| 5,616,999 A | * | 4/1997 | Matsumura et al. | 318/632 |
| 6,049,182 A | * | 4/2000 | Nakatani et al. | 318/432 |
| 6,498,449 B1 | * | 12/2002 | Chen et al. | 318/434 |
| 6,528,962 B1 | * | 3/2003 | Igarashi et al. | 318/461 |
| 7,005,822 B1 | * | 2/2006 | O'Gorman et al. | 318/608 |
| 7,026,775 B2 | * | 4/2006 | Kokubo et al. | 318/268 |
| 7,940,020 B2 | * | 5/2011 | Brown | 318/400.13 |
| 2006/0023007 A1 | | 2/2006 | Muroi | |

FOREIGN PATENT DOCUMENTS

| | | |
|---|---|---|
| JP | 2006-42525 A | 2/2006 |
| JP | 2006-247997 A | 9/2006 |

* cited by examiner

*Primary Examiner* — Walter Benson
*Assistant Examiner* — Thai Dinh
(74) *Attorney, Agent, or Firm* — Canon USA Inc. IP Division

(57) ABSTRACT

A method for controlling a motor can suppress an influence of speed variation due to cogging of the motor. The method includes performing a preliminary drive process to output a first driving signal to the motor to move the mechanism, performing the preliminary drive process to output a second driving signal corresponding to a cogging period of the motor to the motor as well as output the first driving signal, to move the mechanism, determining parameters which include an output waveform and output timing of the second driving signal based on a speed of the mechanism in the preliminary drive process, and outputting the second driving signal according to the determined parameters to the motor as well as outputting the first driving signal to the motor in an actual drive process to perform predetermined processing by moving the mechanism.

15 Claims, 17 Drawing Sheets

APPARATUS MOTOR CONTROL METHOD

BACKGROUND OF THE INVENTION

1. Field of the Invention

The present invention relates to a motor control method performed by an apparatus.

2. Description of the Related Art

An ink jet recording apparatus and an image reading apparatus are provided with a motor control device that drives a motor.

The ink jet recording apparatus performs scanning by a recording head using driving force of the motor. The image reading apparatus performs scanning by a reading unit using the driving force of the motor.

The driving force of the motor includes a torque ripple (cogging torque), which is transmitted to a carriage via a timing belt. A moving speed of the carriage is controlled, for example, by using a previously prepared speed profile. However, the torque ripple causes speed variation in the moving speed. The torque ripple is generated at a certain period according to a structure of the motor. To remove an influence of the torque ripple, a feed forward control method is discussed in which a signal for decreasing the torque ripple is applied.

Japanese Patent Application Laid-Open No. 2006-42525 discusses a configuration in which a rectangular pulse which has a same period as that of the torque ripple is multiplied by a feedback controlled driving signal. It is further discussed that the rectangular pulse is applied at predetermined timing ahead of an opposite phase of the torque ripple.

Japanese Patent Application Laid-Open No. 2006-247997 describes that, when a load given to the motor is relatively large, the influence of cogging becomes relatively large. In Japanese Patent Application Laid-Open No. 2006-247997, thus, an amount of the load is measured and a voltage (duty value) applied to the motor to null the cogging is changed based on the amount of the load. Further, a correction value for changing the voltage and timing for applying the voltage are discussed. Furthermore, it is discussed that the speed variation is measured using an encoder and the above-described processing is performed until a measurement result falls below a threshold value.

However, since there are variations in ink jet recording apparatuses, it often takes a time to adjust the ink jet recording apparatus to reduce the torque ripple. For example, although Japanese Patent Application Laid-Open No. 2006-42525 discusses the timing for applying the rectangular pulse but no specific method for acquiring the timing. Japanese Patent Application Laid-Open No. 2006-247997 does not discuss a specific method for acquiring the timing for applying the voltage to null the cogging, either. As described above, both of the techniques need to perform scanning by a carriage many times to adjust the apparatus, thus taking time for adjustment.

SUMMARY OF THE INVENTION

The present invention is directed to a motor control method.

According to an aspect of the present invention, a method for controlling a motor which is used as a driving source in an apparatus that moves a mechanism by constant speed control includes performing a first preliminary drive to output a first driving signal to the motor to move the mechanism, performing a second preliminary drive to output a second driving signal corresponding to a cogging period of the motor from a predetermined phase to the motor as well as output the first driving signal to the motor, to move the mechanism, determining the phase of the second driving signal when the output of the second driving signal is started based on speeds acquired from the first and second preliminary drives, performing a third preliminary drive to output the second driving signal from the determined phase to the motor as well as output the first driving signal to the motor, to move the mechanism, determining an amplitude of the second driving signal based on a speed acquired from the third preliminary drive, and executing an actual drive by moving the mechanism to perform predetermined processing by starting outputting the second driving signal to the motor based on the determined amplitude and phase as well as outputting the first driving signal to the motor.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EMBODIMENTS

Various exemplary embodiments, features, and aspects of the invention will be described in detail below with reference to the drawings. As one of examples of electronic devices, an ink jet recording device will be used.

Figure 1:
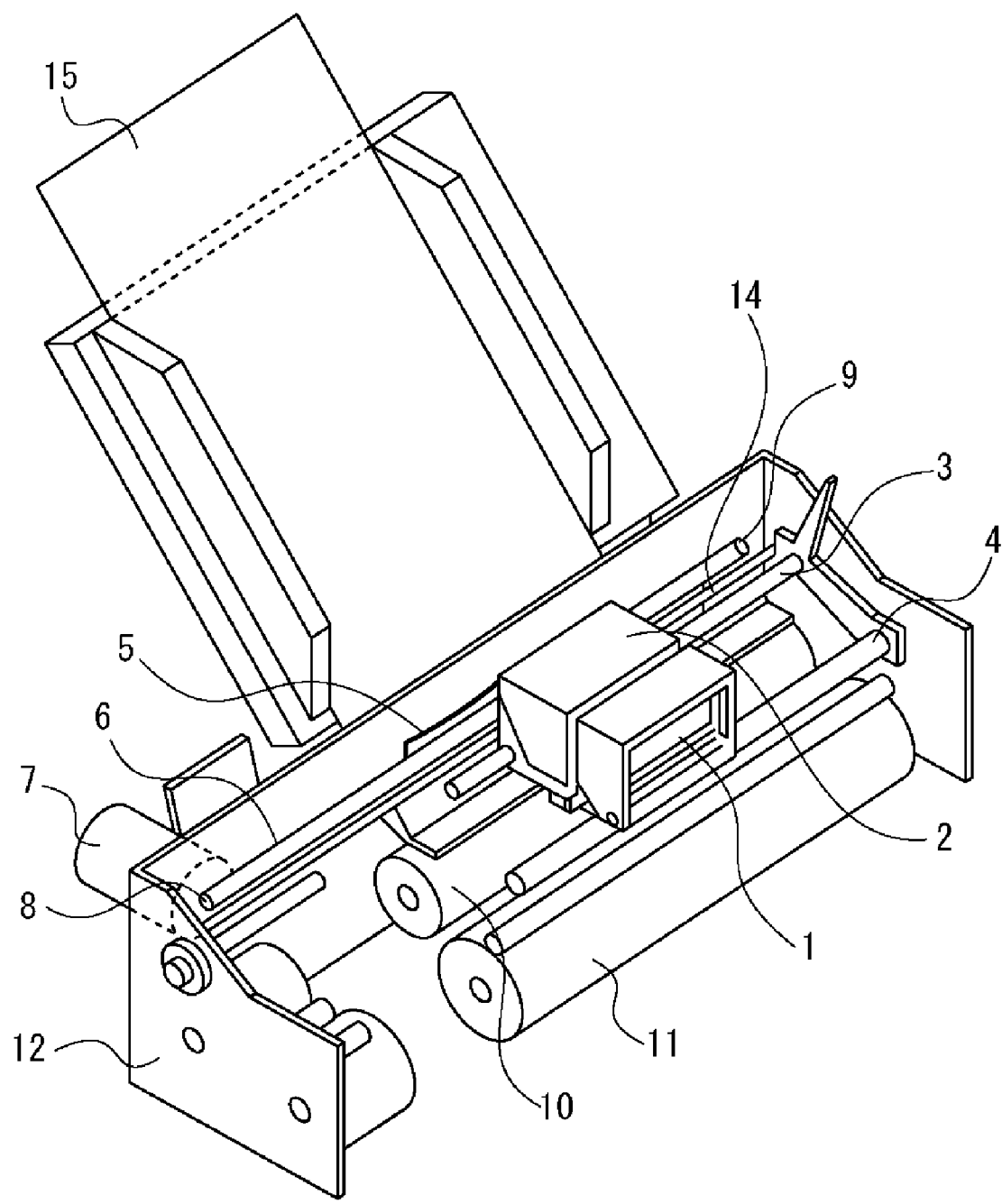
FIG. 1 is a perspective view of an ink jet recording apparatus according to an exemplary embodiment of the present invention.

FIG. 1 is a perspective view of an ink jet recording apparatus according to the present exemplary embodiment. A carriage 2 mounts a recording head 1 and supports a main guide rail 3 and a sub guide rail 4. The carriage 2 moves in a direction that crosses a direction in which a recording medium 15 is conveyed.

A timing belt 6 is stretched between a motor pulley 8 connected to a motor 7 that is a driving source and a driven pulley 9 disposed at a position facing the motor 7. The timing belt 6 is fixed to the carriage 2 and a driving force of the motor 7 is transmitted to the timing belt 6 to move the carriage 2. A conveyance roller 10 is driven by a conveyance motor (not illustrated) to convey the recording medium. A discharge roller 11 discharges the recording medium on which an image is recorded outside the apparatus.

Figure 2:
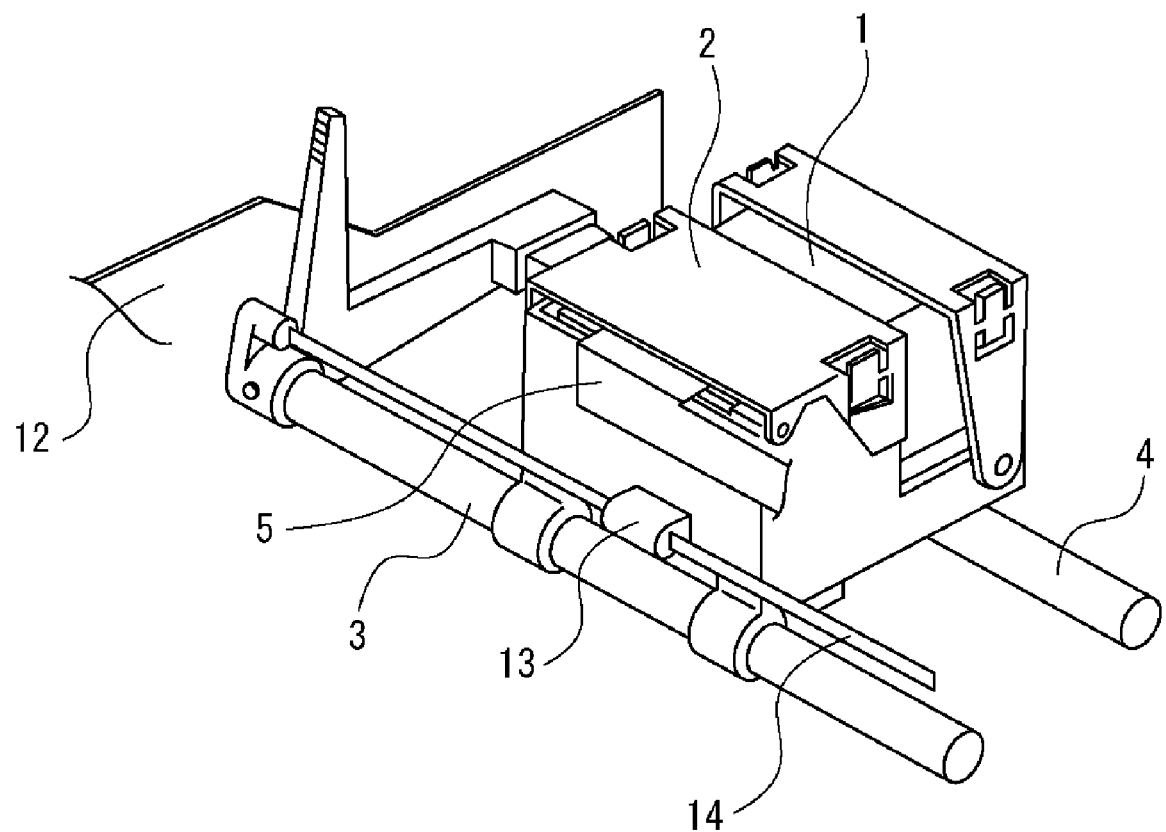
FIG. 2 is a perspective view of a carriage according to the exemplary embodiment.

FIG. 2 is a perspective view of the carriage according to the present exemplary embodiment. In FIG. 2, an encoder sensor 13 attached to the carriage 2 reads an encoder scale 14 provided in parallel to a scanning direction of the carriage 2 and outputs a signal. The signal is transmitted to a central processing unit (CPU) 23 via a flexible substrate 5. The CPU 23 counts a number of sensor signals output from the encoder sensor and acquires a position, an amount of movement, and a speed in the scanning direction of the carriage 2.

Figure 3:
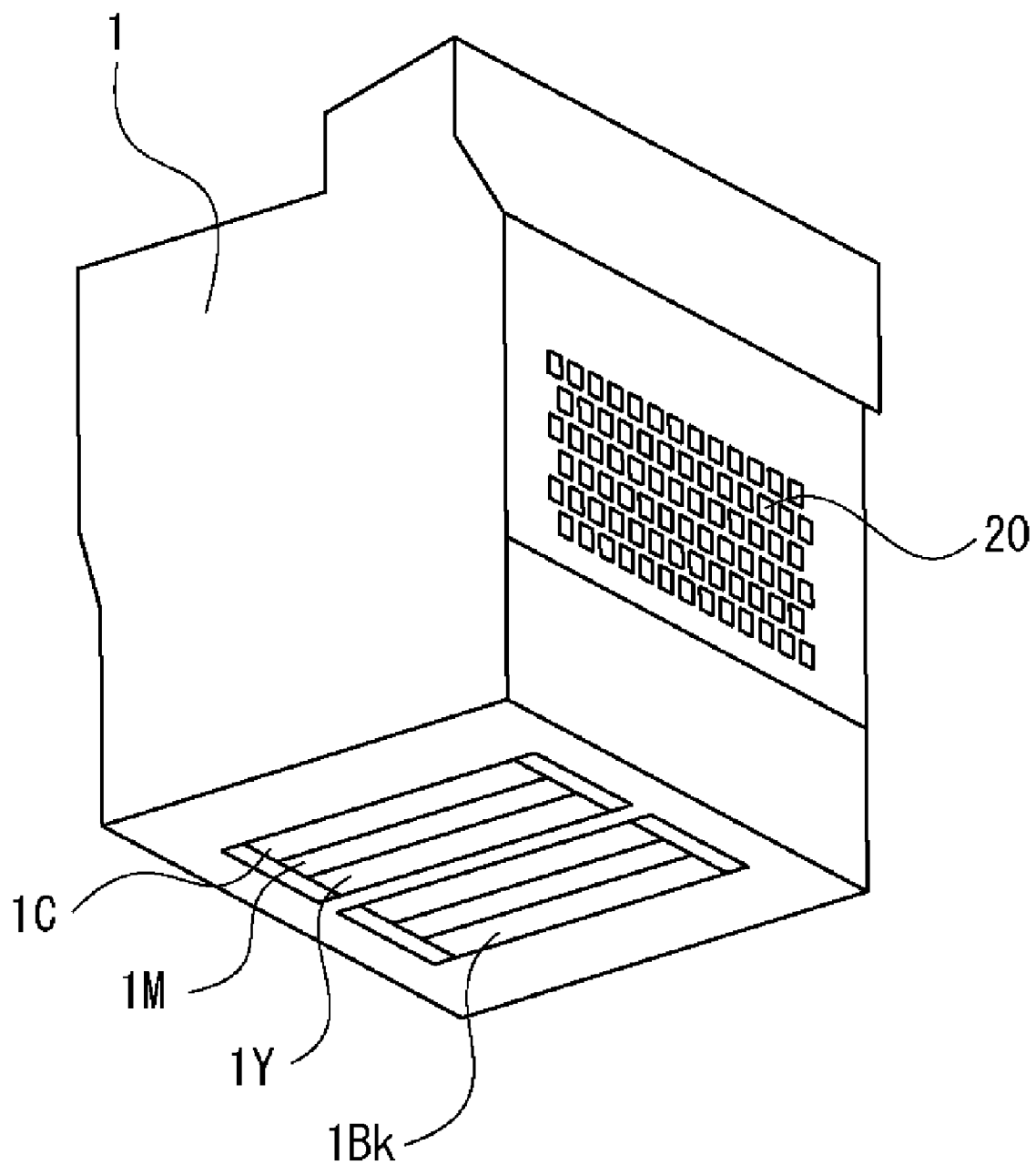
FIG. 3 is a perspective view of a recording head according to the exemplary embodiment.

FIG. 3 is a perspective view of a recording head according to the present exemplary embodiment. On a part of the recording head 1 which faces a recording sheet, nozzle arrays 1M, 1C, 1Y, and 1Bk for each ink color are disposed. An electric connection unit 20 of the recording head 1 is connected to an electric connection unit (not illustrated) of the carriage 2. The flexible substrate 5 connects the electric connection unit of the carriage 2 to a substrate on which the CPU 23 is disposed.

Figure 4:
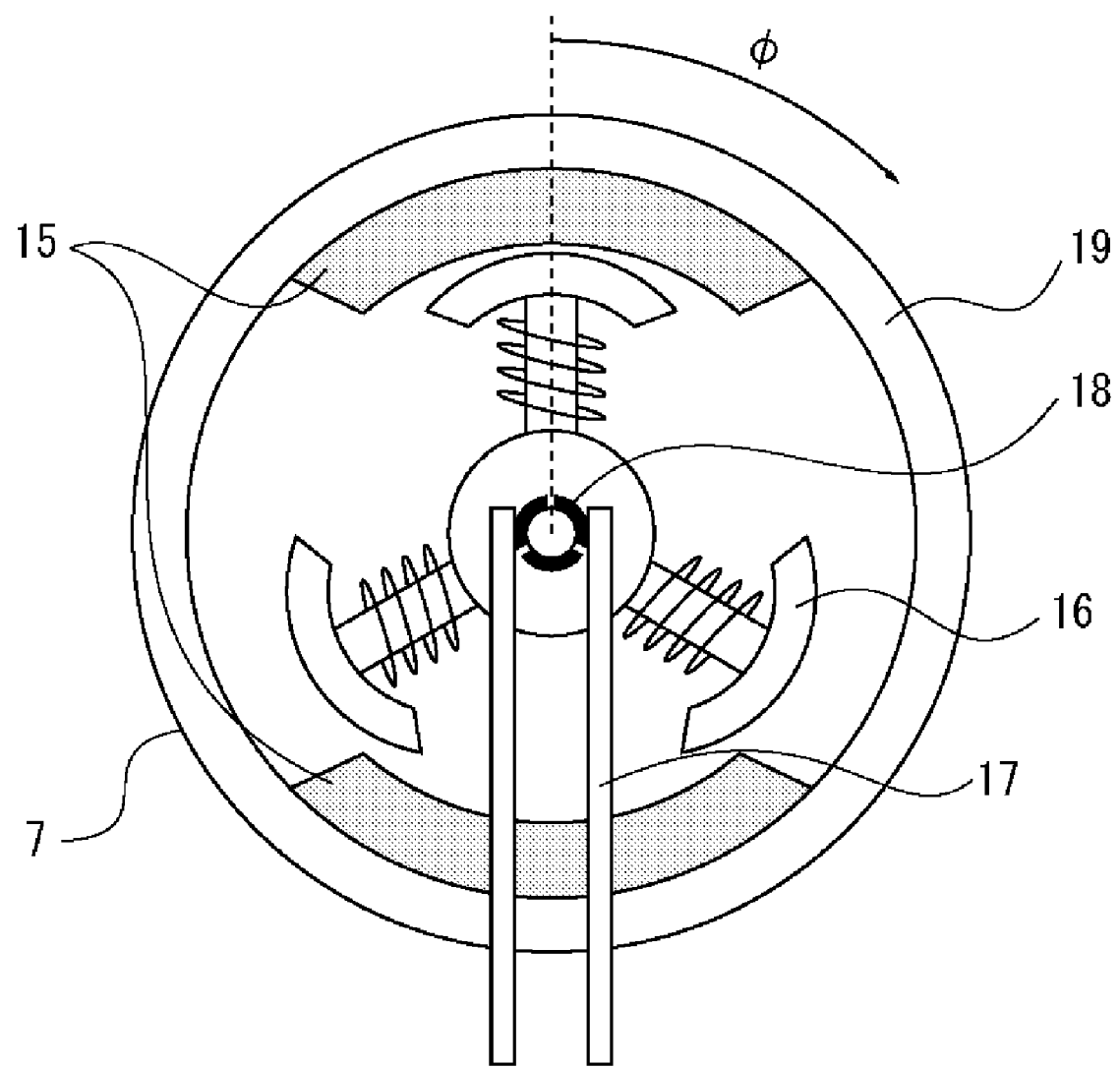
FIG. 4 is a cross sectional view of a direct current (DC) motor with a brush.

FIG. 4 is a cross sectional view of a direct current (DC) motor with a brush. The motor 7 often uses the DC motor for various reasons such as noise, costs, and control performance. The DC motor with a brush includes a magnet 15, a rotor 16, a brush 17, a rectifier 18, and a motor housing 19. The rotor 16 which has a rotational structure changes a polarity of a magnetic field by operations of the brush 17 and the rectifier 18, and repeats attraction/repulsion between the magnet 15 to drive the motor 7.

When the motor 7 is driven, a periodical pulse of the torque, which is referred to as the torque ripple or the cogging torque, is generated. The cogging torque refers to a phenomenon in which an attraction force pulsates depending on a switch of the brush 17, magnetic variation of the magnet 15, and a rotation angle $\phi$ of the motor 7. The present exemplary embodiment describes the DC motor with a brush, however, the motor is not limited to this type.

Figure 5:
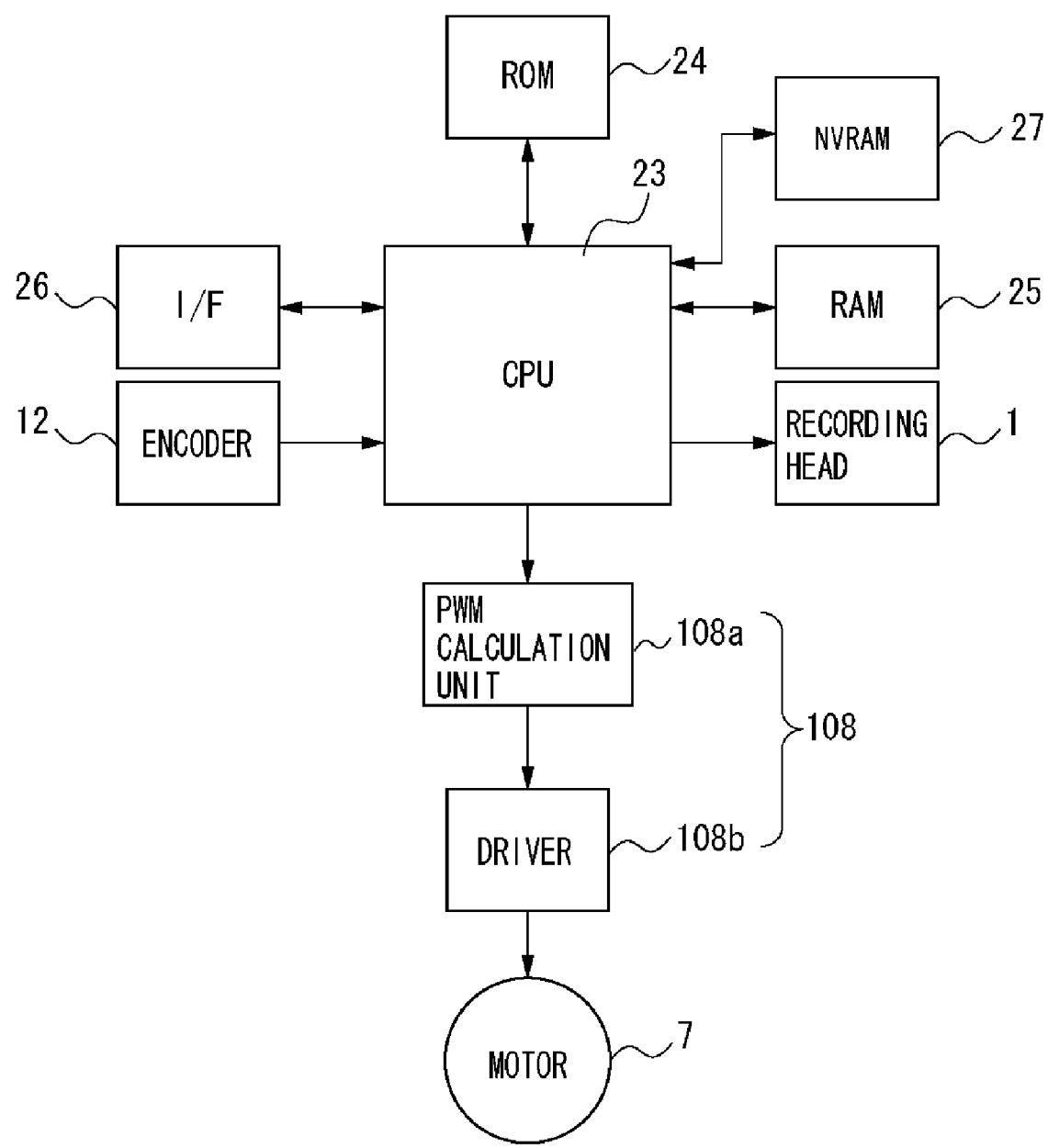
FIG. 5 illustrates a structure of a control unit of the ink jet recording apparatus according to the exemplary embodiment.

FIG. 5 illustrates a configuration of a control unit of the ink jet recording apparatus. The control unit controls the inkjet recording apparatus. The CPU 23 executes a program stored in a read only memory (ROM) 24. The CPU 23 performs image processing, communication processing with a host computer via an interface (I/F) unit 26, driving control of the recording head 1, and a signal output to a pulse width modulation (PWM) calculation unit 108a. The CPU 23 may be integrated with an application specific integrated circuit (ASIC) (not illustrated) which is an integrated circuit.

The ROM 24 stores programs and control parameters for controlling the motor and the recording head. A random access memory (RAM) 25 is used to store the program in operation by CPU 23, recorded data transmitted from the host computer, and data to be recorded. A non-volatile random access memory (NVRAM) 27 stores a correction value described below. The NVRAM 27 may be a flush memory or an electronically erasable and programmable read only memory (EEPROM), as long as the memory is a storage unit capable of storing and reading the data.

A driving circuit 108 includes a PWM calculation unit 108a and a driver 108b. The PWM calculation unit 108a inputs the driving signal to calculate a width of a pulse voltage. The driver 108b is a driving circuit which drives the motor 7 based on a result calculated by the PWM calculation unit 108a.

Figure 6:
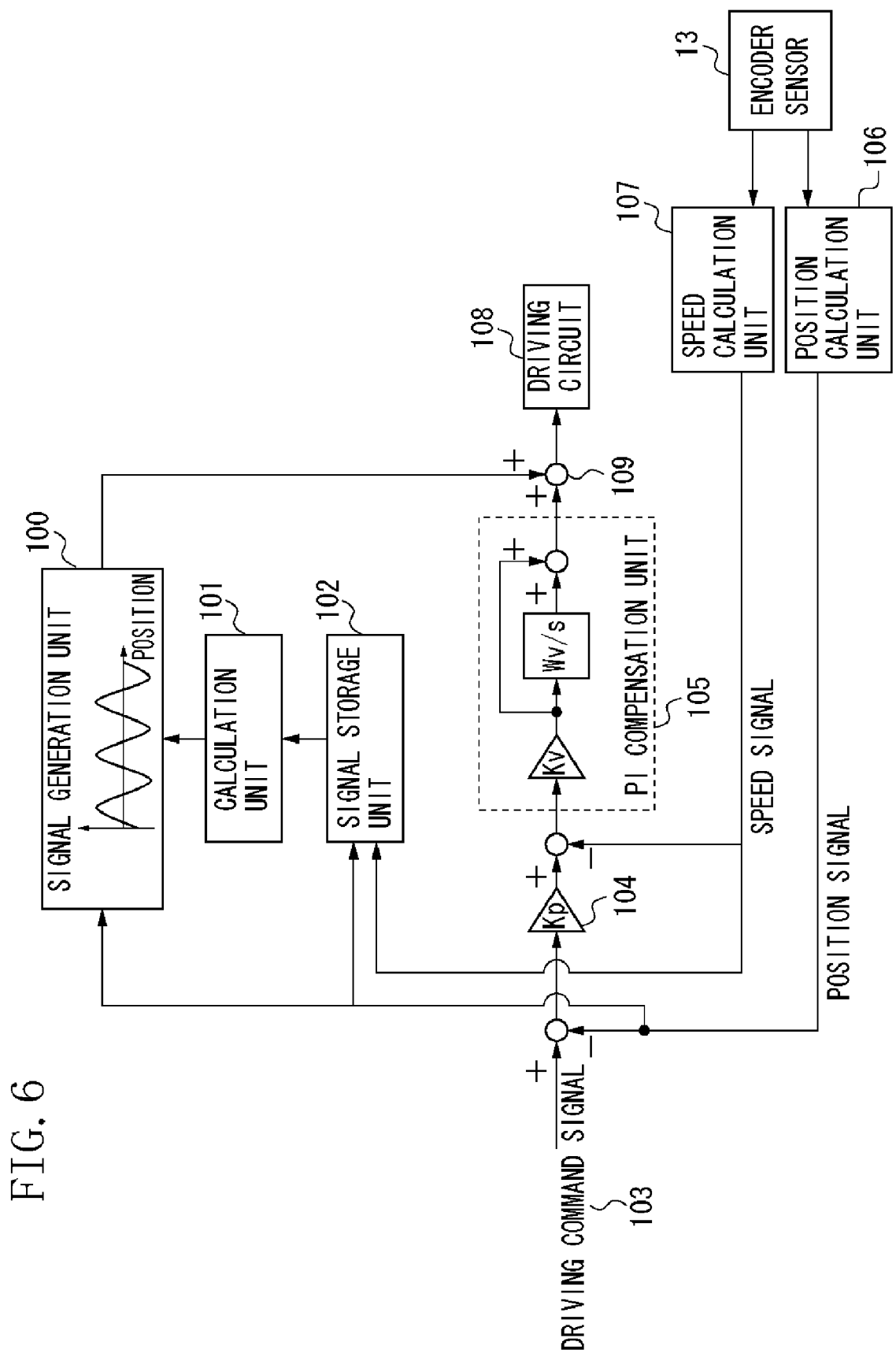
FIG. 6 illustrates a control configuration of a control unit in the ink jet recording apparatus according to the exemplary embodiment.

FIG. 6 illustrates a control configuration according to the present exemplary embodiment. A driving command signal 103 is a driving profile of the carriage 2 which is previously determined by the program. The driving profile includes profiles for acceleration control, constant speed control, and speed reduction control. By following the driving command signal 103, the carriage 2 can move at a desired speed.

A position calculation unit 106 and a speed calculation unit 107 acquire position information and speed information about the carriage 2 respectively based on the signal input from the encoder 12. The information is fed back as a speed signal and a position signal. Control units 104 and 105 perform a feedback control (FB control) by using the position signal, the speed signal, and the driving command signal 103. The FB control performs a predetermined calculation algorithm.

A signal generation unit 100 generates and outputs a period signal described below. A calculation unit 101 calculates parameters such as an amplitude, a frequency, and a phase of the period signal to be generated. A signal storage unit (information storage unit) 102 stores the speed information and the position information. The calculation unit 101 calculates the parameters of the period signal to be generated using the speed information and the position information stored in the signal storage unit 102.

With the configuration described above, a first driving signal output from the control unit 105 and a second driving signal output from the signal generation unit 100 are input to the driving circuit 108 to drive the motor 7.

Figure 7:
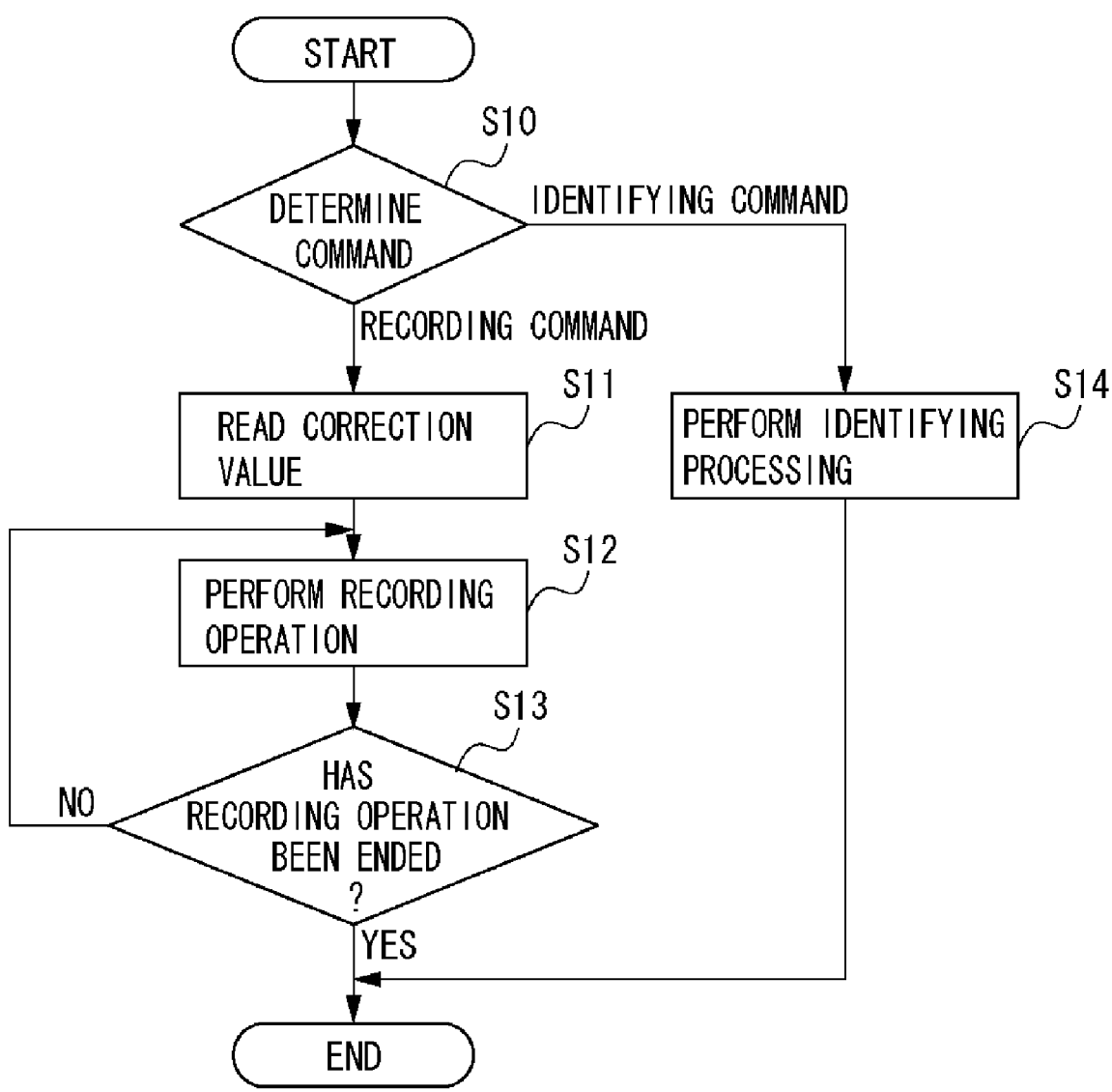
FIG. 7 illustrates an operation flow performed by the ink jet recording apparatus according to the exemplary embodiment.

FIG. 7 illustrates a processing flow performed by the ink jet recording apparatus. The CPU 23 controls the processing. In step S10, when the CPU 23 receives a signal from a host apparatus, the CPU 23 determines a command included in the signal. When the command is a recording command, the processing proceeds to step S11 and the CPU 23 reads the parameter of the period signal. The read parameter is set to the signal generation unit described below. Then in step S12, the CPU 23 causes the recording head to perform scanning and recording.

At this time, the period signal can decrease the influence of the cogging torque of the motor, and thus variation of a scanning speed of the recording head can be suppressed. In step S13, the CPU 23 determines whether the recording operation finishes. When the recording operation does not finish (No in step S13), the processing returns to step S12 to perform the recording operation. When the recording operation finishes (Yes in step S13), the processing ends.

In step S10, when the command content is determined as an identifying command, the processing proceeds to step S14 to perform the identifying processing. In the identifying processing, in order to acquire the parameters of the periodic signal, the CPU 23 causes the recording head to perform scanning to acquire the speed information and calculates parameters of the period signal.

Figure 8:
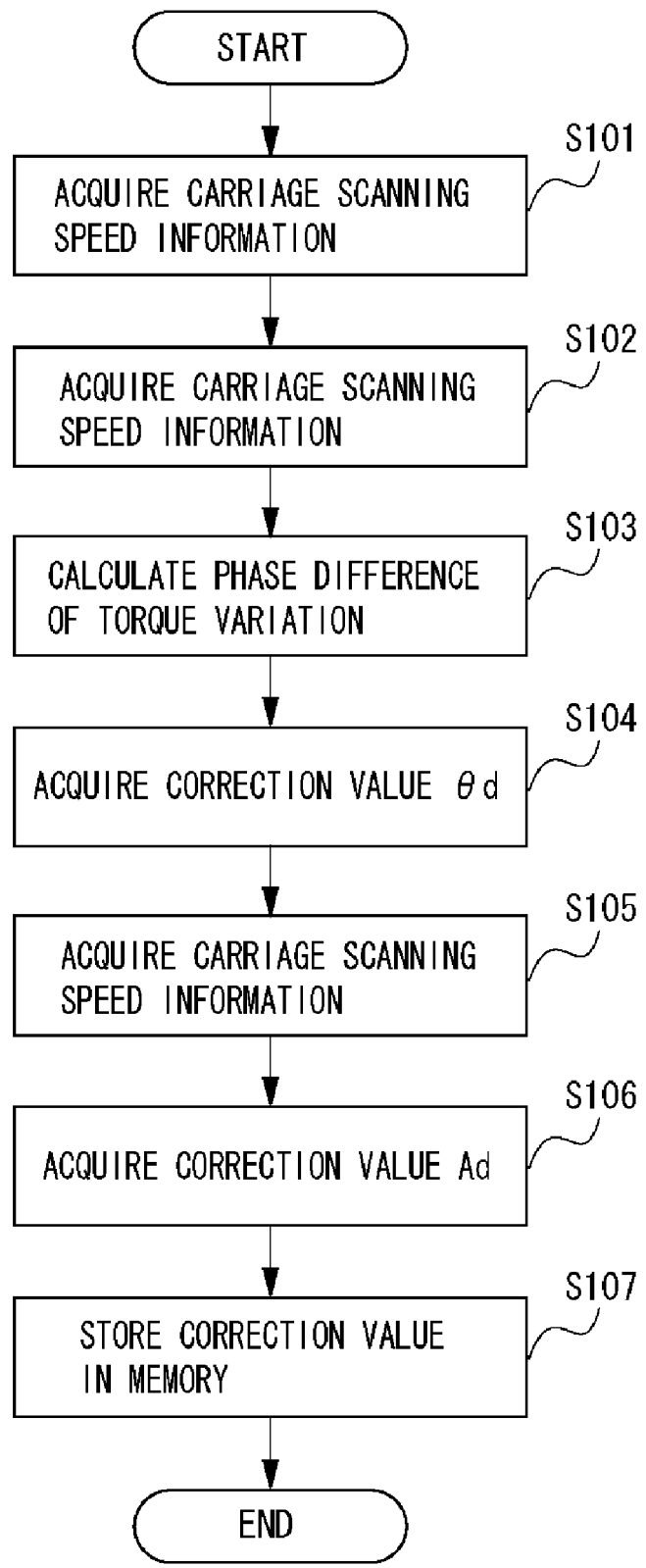
FIG. 8 illustrates a processing flow of identifying processing according to a first exemplary embodiment of the present invention.

With reference to FIG. 8, the identifying processing according to the first exemplary embodiment will be described. The identifying processing is performed to acquire the parameter of the period signal under control by the CPU 23 as illustrated in FIG. 5. The identifying processing performs three preliminary drives. The parameters acquired by the preliminary drives are used when actual driving is executed. FIG. 8 illustrates a phase determination process for determining the phase of the period signal and an amplitude determination process for determining the amplitude of the period signal.

In step S101, the carriage performs scanning according to a predetermined driving command signal and information about the scanning speed of the carriage at this time is acquired. Then in step S102, a period signal of an amplitude value A is applied to the predetermined driving command signal, and the carriage performs scanning. Information about the scanning speed of the carriage at this time is acquired.

Based on the speed information acquired insteps S101 and S102, in step S103, a phase difference between the torque variations caused by the signal is calculated. More specifically, a difference value between the speeds is acquired.

Based on a result calculated in step S103, in step S104, a correction value ed of the phase for suppressing the cogging torque is acquired. The correction value ed is a correction value of the phase of the signal.

In step S105, a period signal in which the correction value ed and the amplitude A are reflected is applied to the predetermined driving command signal. Then, the carriage performs scanning and the information about the scanning speed of the carriage is acquired. In step S106, an amplitude ratio is calculated from the amplitude of the speed acquired in step S105 and that of the speed acquired in step S101. Further, a correction value Ad is acquired from the calculation result.

In step S107, the correction value ed of the phase and the correction value Ad of the amplitude that are acquired in the processing described above are stored in the NVRAM 27 illustrated in FIG. 5.

To acquire the speed information, for example, the information is temporarily stored in the memory (the RAM 25 illustrated in FIG. 5.) The speed information is acquired in a predetermined scanning range in a constant speed control region.

Waveform information stored in the non-volatile memory (the NVRAM 27 illustrated in FIG. 5) is read when a power is turned on and set in a register of the signal generation unit 100. Accordingly, when the recording operation is executed, the period signal is applied based on the acquired waveform information to suppress the speed variation when the carriage performs scanning.

Figure 9A:
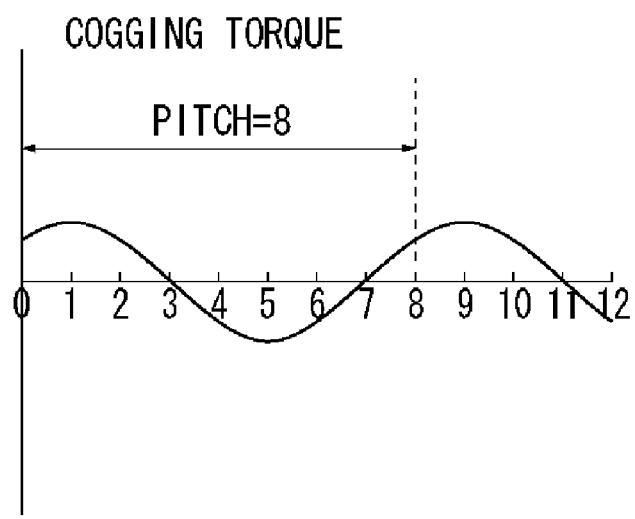
FIGS. 9A, 9B and 9C illustrate torque variations (speed variations) according to the first exemplary embodiment.
Figure 9B:
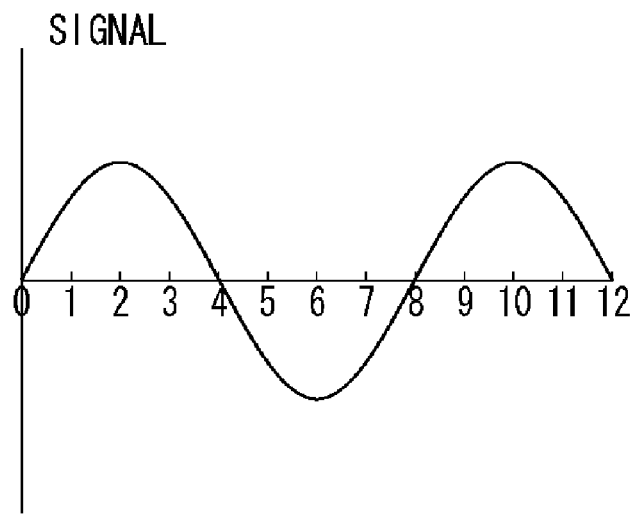

With reference to FIGS. 9A and 9B, the period signal will be described. FIG. 9A illustrates the cogging torque at a position of the carriage of a printer. According to the exemplary embodiment, one period of the cogging torque is equivalent to eight pulses of the encoder.

FIG. 9B illustrates a waveform of a signal output from the signal generation unit 100. The signal generation unit 100 generates the signal such that one period of the signal is equivalent to the one period of the cogging torque. Thus, the signal generation unit 100 generates the signal based on a number of the pulses of the encoder equivalent to the one period of the cogging torque and the moving speed of the carriage.

Every printer has a different phase of the cogging torque at a predetermined position. This is because, for example, the printers are not manufactured to have uniform relations between a position (angle) of the rotor 16 in the rotation direction and a position of the carriage in the scanning direction. Therefore, the phase of the signal does not always correspond to that of the cogging torque. Thus a phase difference between the phase of the signal and that of the cogging torque is a value unique to each printer.

According to examples illustrated in FIGS. 9A and 9B, the phase in FIG. 9B is two pulses behind that in FIG. 9A. In other words, the phase of the signal is $\pi/4$ behind that of the cogging torque. This phase difference is the value unique to the printer.

Figure 9C:
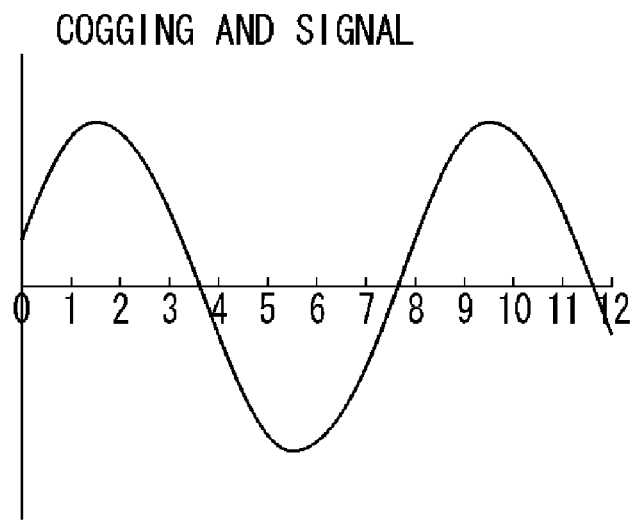

FIG. 9C illustrates the torque of the motor which is applied the period signal thereto and drives. The torque of the motor varies corresponding to the period of the period signal. Accordingly, the torque of the motor which is applied the period signal thereto and drives has a predetermined phase difference from the torque of the motor to which the period signal is not applied as illustrated in FIG. 9A.

Figure 10A:
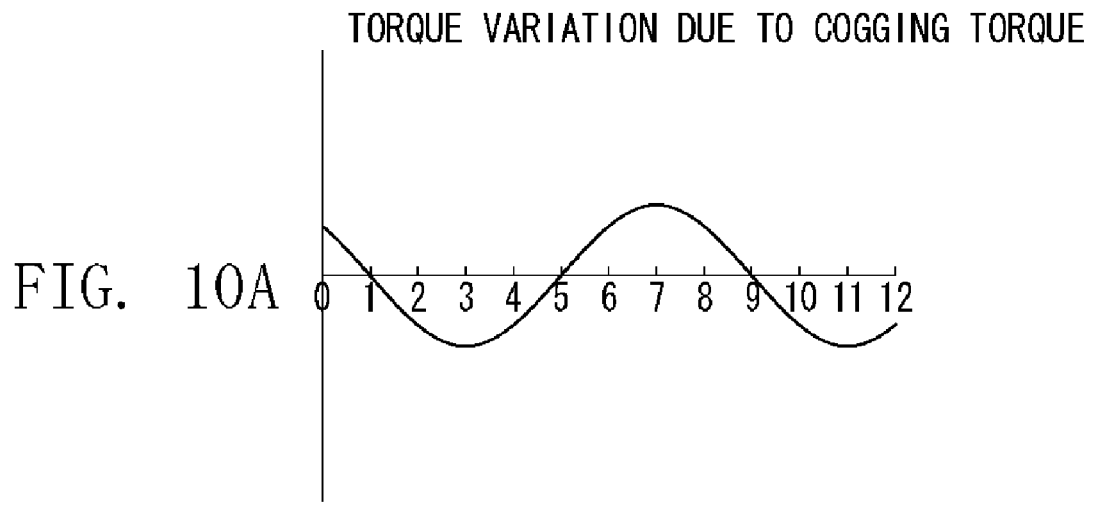
FIGS. 10A, 10B, and 10C illustrate torque variations (speed variations) according to the first exemplary embodiment.
Figure 10B:
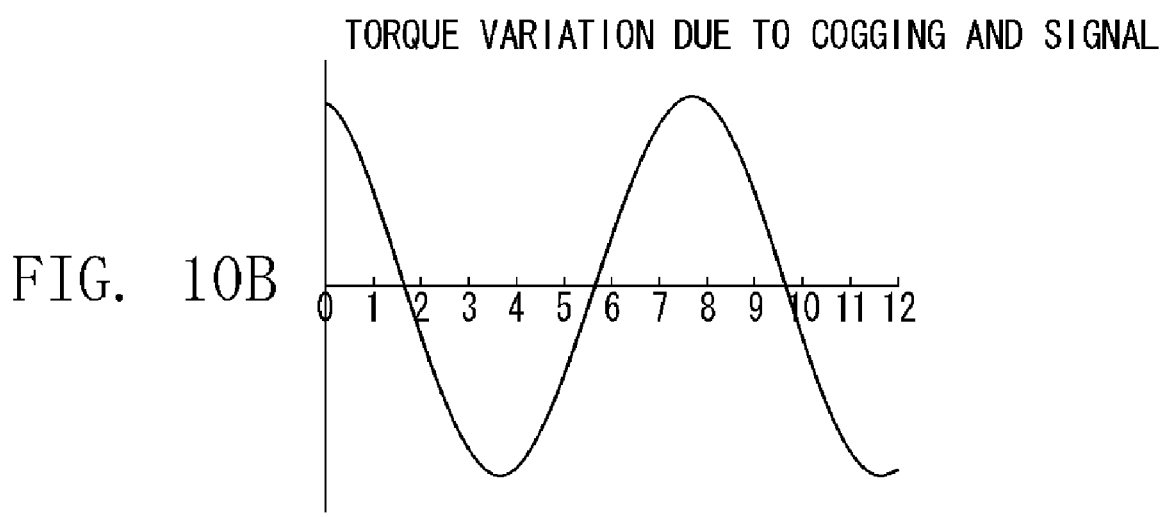
Figure 10C:
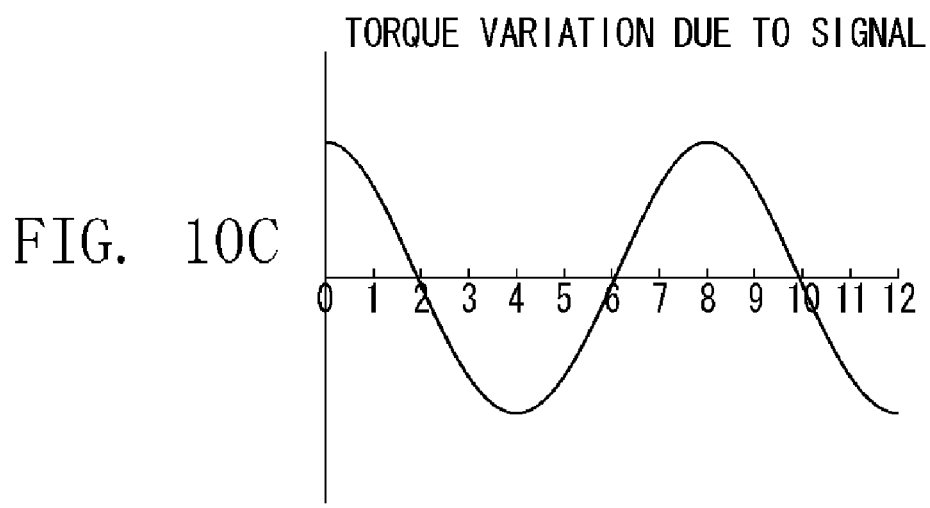

With reference to FIGS. 10A, 10B, and 10C, the speed variation of the carriage will be described. FIG. 10A illustrates the speed information acquired in step S101. As illustrated in FIG. 10A, the carriage speed is influenced by the cogging torque, and thus the torque varies.

FIG. 10B illustrates the speed information acquired in step S102. As illustrated in FIG. 10B, the carriage speed is influenced by the cogging torque and the period signal, and thus the speed varies.

FIG. 10C illustrates a difference value between the speed variation illustrated in FIG. 9A and that illustrated in FIG. 9B. The difference between the speed variations is influenced by the signal illustrated in FIG. 9B. If the phase of the torque illustrated in FIG. 10C is shifted and applied to the torque illustrated in FIG. 9A, the torque variation of the carriage can be suppressed. To suppress the torque variation, in step S104, a phase amount $\theta d$ to be shifted (phase correction value) is acquired. The phase amount $\theta d$ to be shifted (phase correction value) is acquired based on a position at which the amplitude is maximum in FIG. 10A and a position at which the amplitude is minimum in FIG. 10C.

Figure 11A:
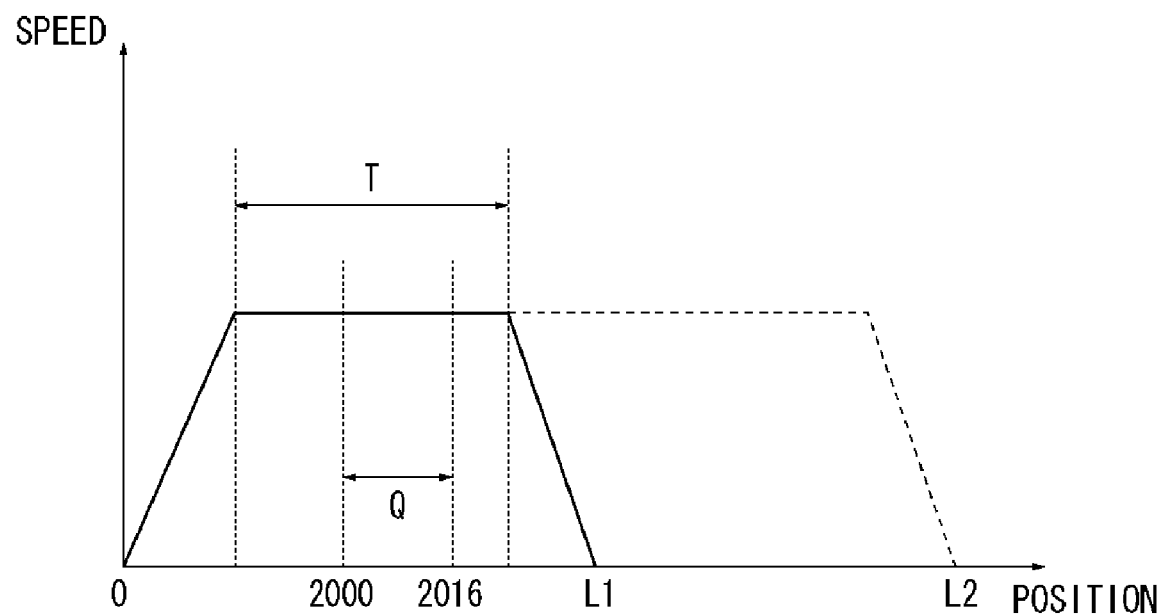
FIGS. 11A and 11B illustrate the identifying processing according to the first exemplary embodiment.
Figure 11B:
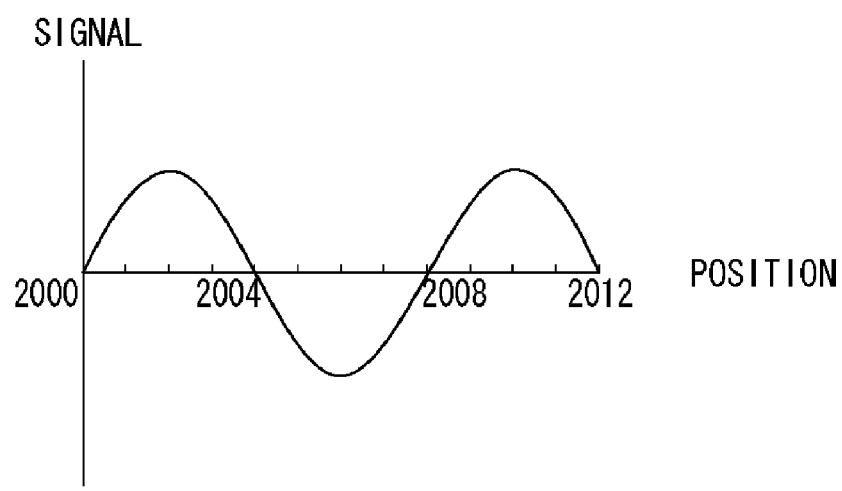

FIG. 11A illustrates scanning by the carriage and a range in which the speed information is acquired in steps S101 and S102. FIG. 11B illustrates positions where the signal is started to be output.

In FIG. 11A, a width L1 of scanning performed by the carriage in steps S101 and S102 is smaller than the maximum width L2 of scanning in the ink jet recording apparatus. In steps S101 and S102, the speed information in a predetermined region (moving range) Q is acquired in a constant speed control region T of the carriage. As illustrated in FIG. 11B, the signal generation unit 100 outputs the period signal in a range between 2000 pulse to 2016 pulse (range of two cogging periods).

As described above, the identifying processing is performed by using the minimum scanning width, and thus a scanning time can be decreased. Further, since the identifying processing is performed by using the minimum data amount, the identifying processing can be performed in a short time using a less memory capacity.

Figure 12:
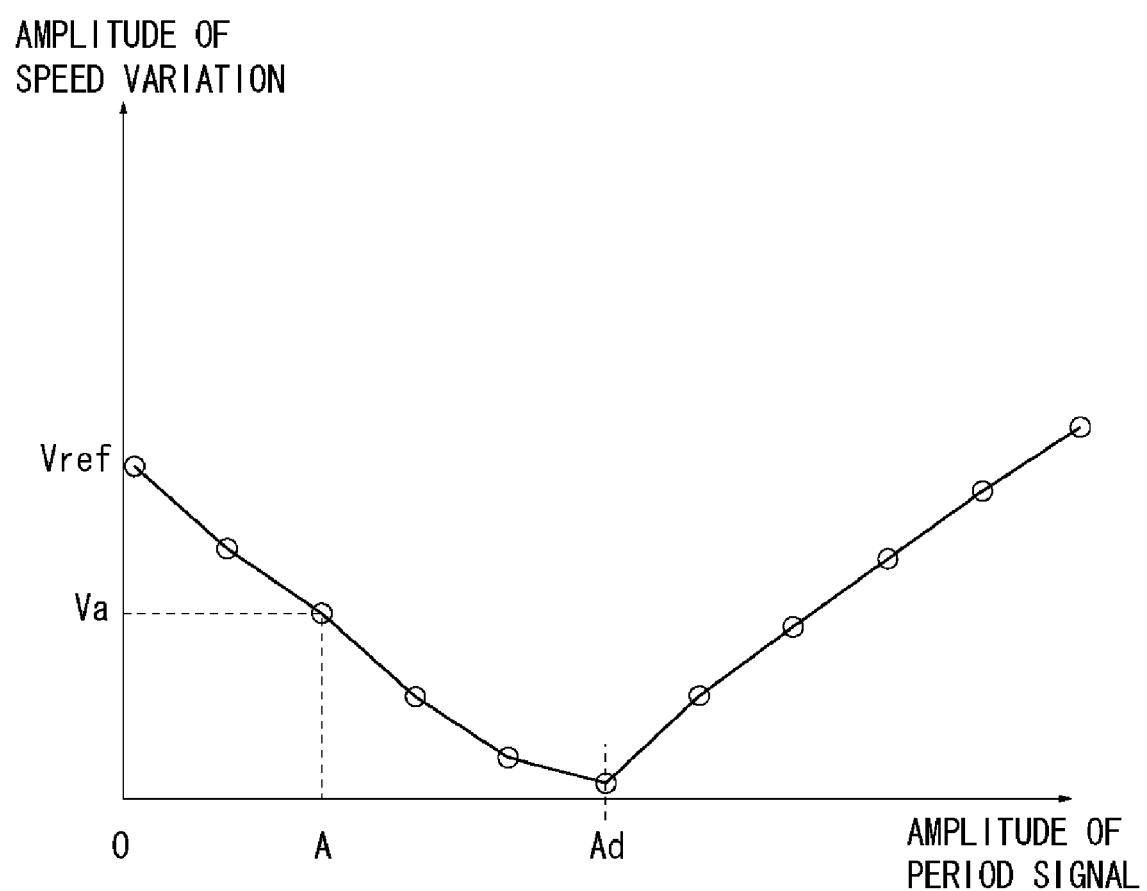
FIG. 12 illustrates the torque variation (speed variation) according to the first exemplary embodiment.

With reference to FIG. 12, the correction value Ad acquired in step S106 will be described. In FIG. 12, a horizontal axis represents an amplitude value of the period signal, and a vertical axis represents an amplitude value of the speed variation. Accordingly, in FIG. 12, the amplitude value Ad when the speed variation is minimum can be acquired by calculation from speed variation Vref when the amplitude of the period signal is zero (the period signal is not applied) and speed variation Va when the period signal of the amplitude A is applied. This is because, when the amplitude of the period signal is increased, the speed variation is decreased at a certain rate.

A second exemplary embodiment will be described. With reference to FIGS. 13A, 13B, and 13C, and FIGS. 14A, 14B, 14C, and 14D, the identifying processing will be described. Similar descriptions to that in the first exemplary embodiment will not be repeated. In the second exemplary embodiment, it is assumed that transmission characteristic is different when the position of the carriage is largely different. However, the transmission characteristic is considered to be equal in given vicinity. The one period of the cogging is equivalent to eight pulses of the encoder.

Figure 13A:
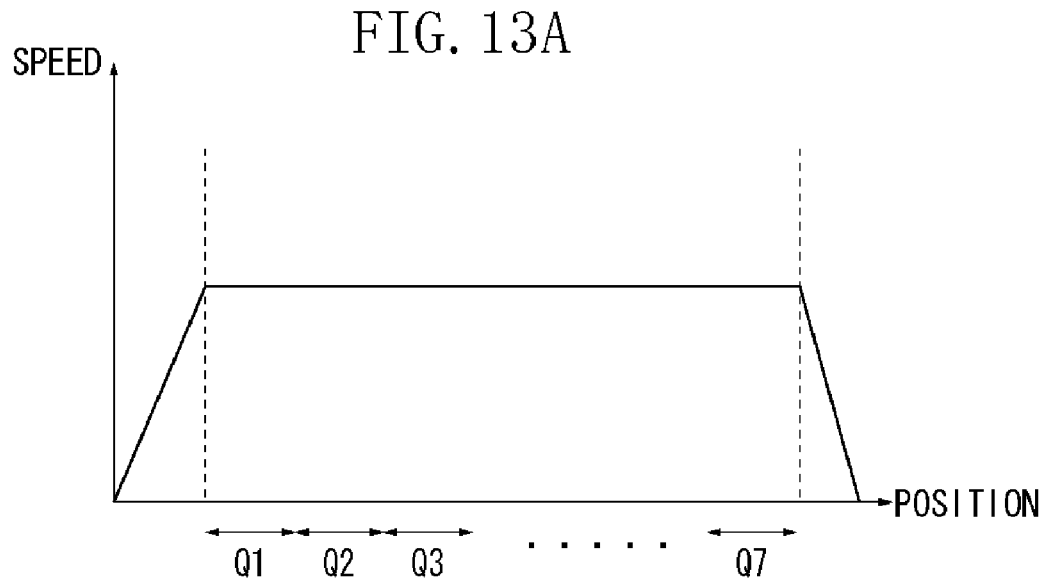
FIGS. 13A, 13B, and 13C illustrate the identifying processing according to a second exemplary embodiment of the present invention.

Therefore, as illustrated in FIG. 13A, the constant speed control region is divided into a plurality (7) of regions (Q1, Q2, Q3, Q4, Q5, Q6, and Q7). For example, it is assumed that the 1000th pulse is a start position of the constant speed control region, and one region includes 800 pulses.

In this case, a pulse location of the region Q1 is 1000th to 1799th pulse. The pulse location of the region Q2 is 1800th to 2599th pulse. The pulse location of the region Q3 is 2600th to 3399th pulse.

Figure 13B:
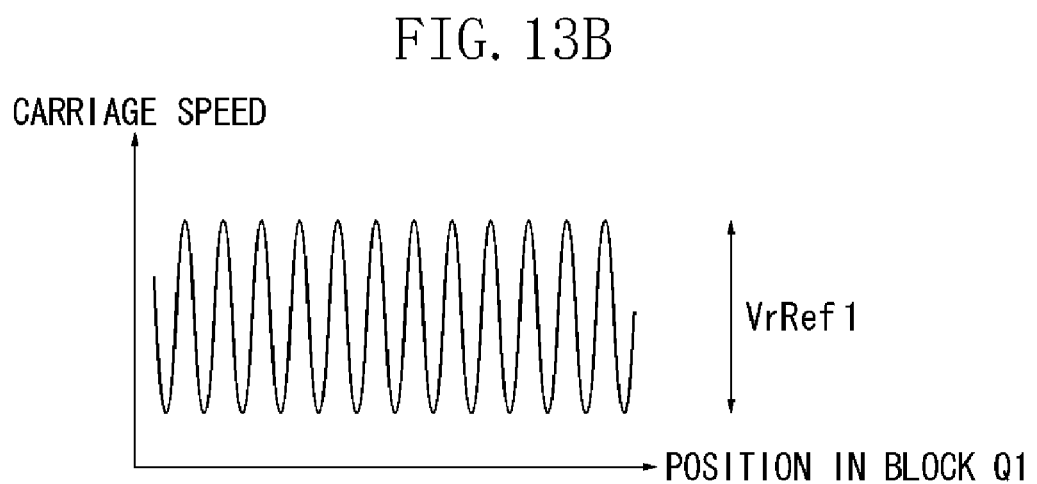
Figure 13C:
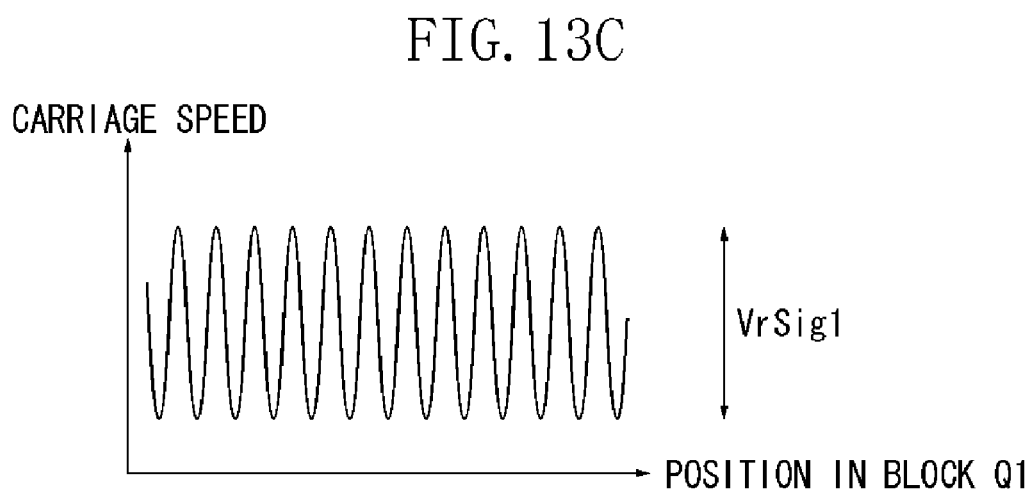

A ratio is acquired between an amplitude VrRef 1 illustrated in FIG. 13B of the speed variation when the period signal is not applied and an amplitude VrSig 1 illustrated in FIG. 13C of the speed variation when the period signal is applied. The ratio is acquired in each region (each movement range). So that, seven ratios are acquired. Based on the phase corresponding to the region which has the minimum ratio, the correction value θd is acquired.

Figure 14A:
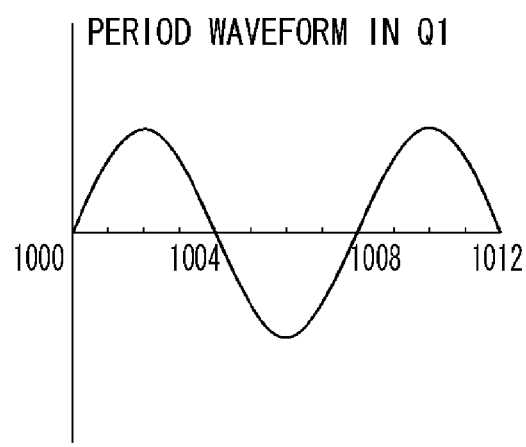
FIGS. 14A, 14B, 14C, and 14D illustrate the torque variations (speed variations) according to the second exemplary embodiment.
Figure 14B:
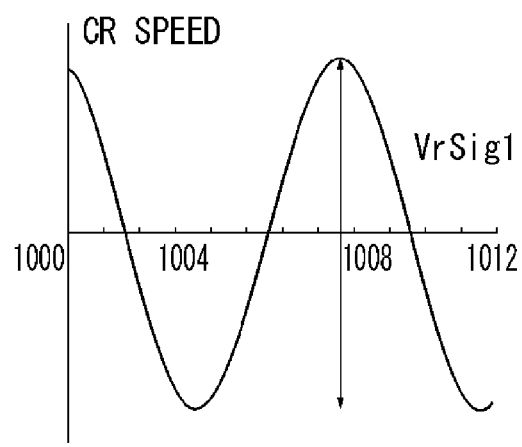
Figure 14C:
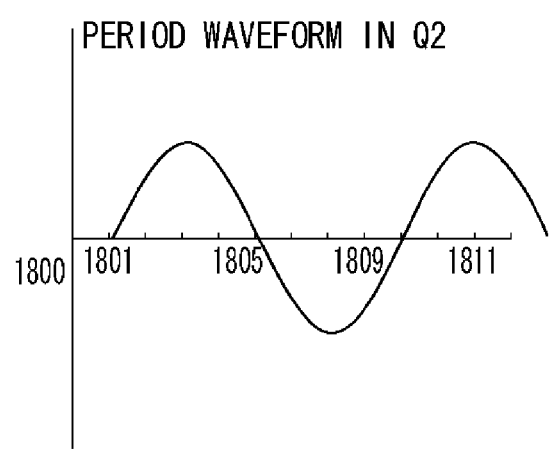

FIGS. 14A and 14C illustrate a period waveform in each region. Figures along the horizontal axis are values for describing the period and the phase. For example, the period waveform as illustrated in FIG. 14A is applied from the start position (1000) of the region Q1. FIG. 14B illustrates the speed when the period waveform illustrated in FIG. 14A is applied. There is no shift of the phase in the region Q1. Output of the signal is stopped at an end position 1799 of the region Q1.

Figure 14D:
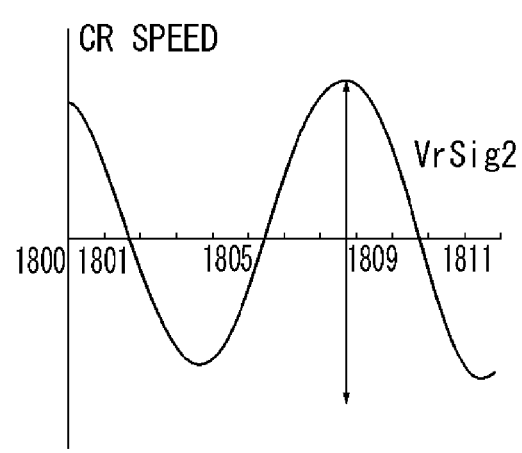

The period waveform as illustrated in FIG. 14C is applied from an end of the region Q2. FIG. 14D illustrates the speed when the period waveform of FIG. 14C is applied. The period signal whose phase is one pulse behind as illustrated in FIG. 14C is applied from the start position (1800) of the region Q2. At the end position (2599) of the region Q2, output of the period signal whose phase is one pulse behind is stopped.

In other regions, period signals which have different phrases are similarly applied. From the start position of the region Q3, the period signal whose phase is three pulses behind is applied. From the start position of the region Q4, the period signal whose phase is four pulses behind is applied. From the start position of the region Q7, the period signal whose phase is seven pulses behind is applied.

Figure 15:
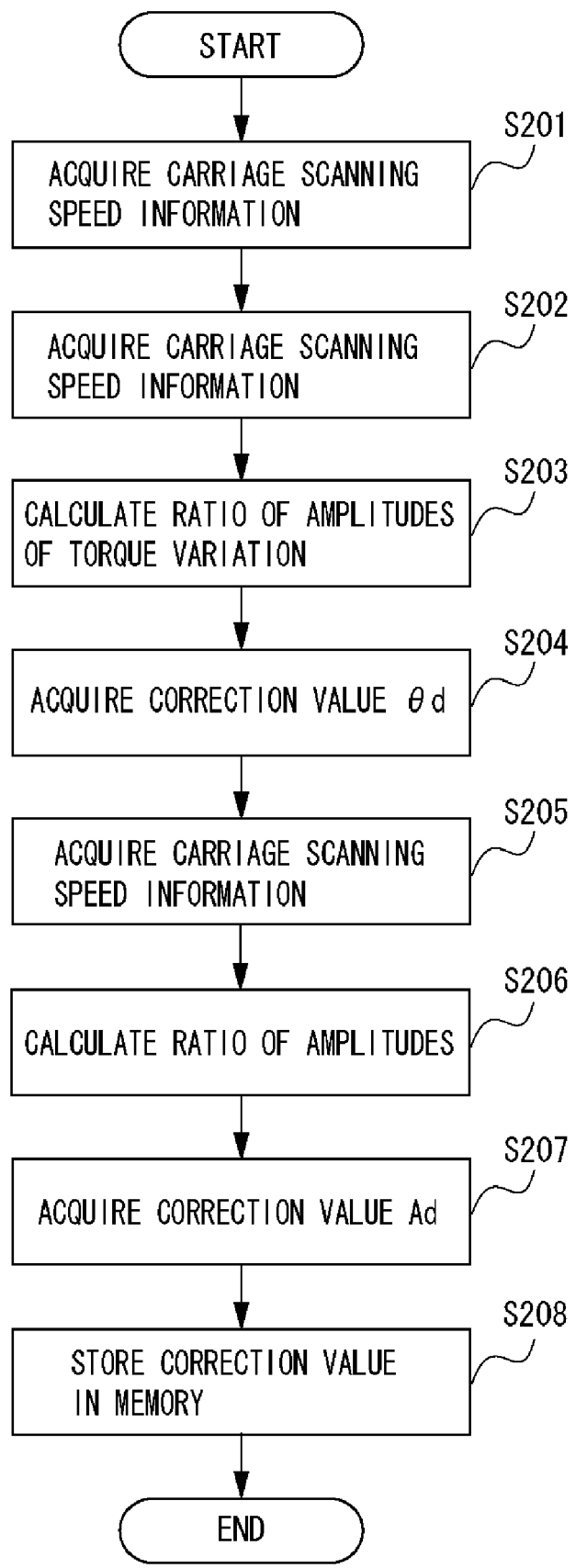
FIG. 15 illustrates a processing flow of the identifying processing according to the second exemplary embodiment.

FIG. 15 illustrates a flow of the identifying processing according to the second exemplary embodiment. The carriage performs scanning according to the predetermined driving command signal. FIG. 15 illustrates amplitude ratio acquisition processing for acquiring the amplitude ratio of the speed variations to determine the phase of the period signal.

In step S201, information about the scanning speed of this carriage is acquired. In step S202, the period signal which has the amplitude value A is applied to the predetermined driving command signal and the carriage performs scanning to acquire the information about the scanning speed of the carriage.

In step S203, based on the speed information acquired in steps S201 and S202, the amplitude ratios of the regions Q1 to Q7 are acquired.

Then, the region which has the minimum amplitude ratio is specified from a result calculated in step S103. Phase information about the period signal applied in the specified region is acquired. In step S204, based on the phase information, the correction value θd of the phase for suppressing the cogging torque is acquired. The correction value θd is the correction value of the phase of the signal. Since a following processing flow is similar to that of the first exemplary embodiment, the descriptions thereof will not be repeated.

Figure 16:
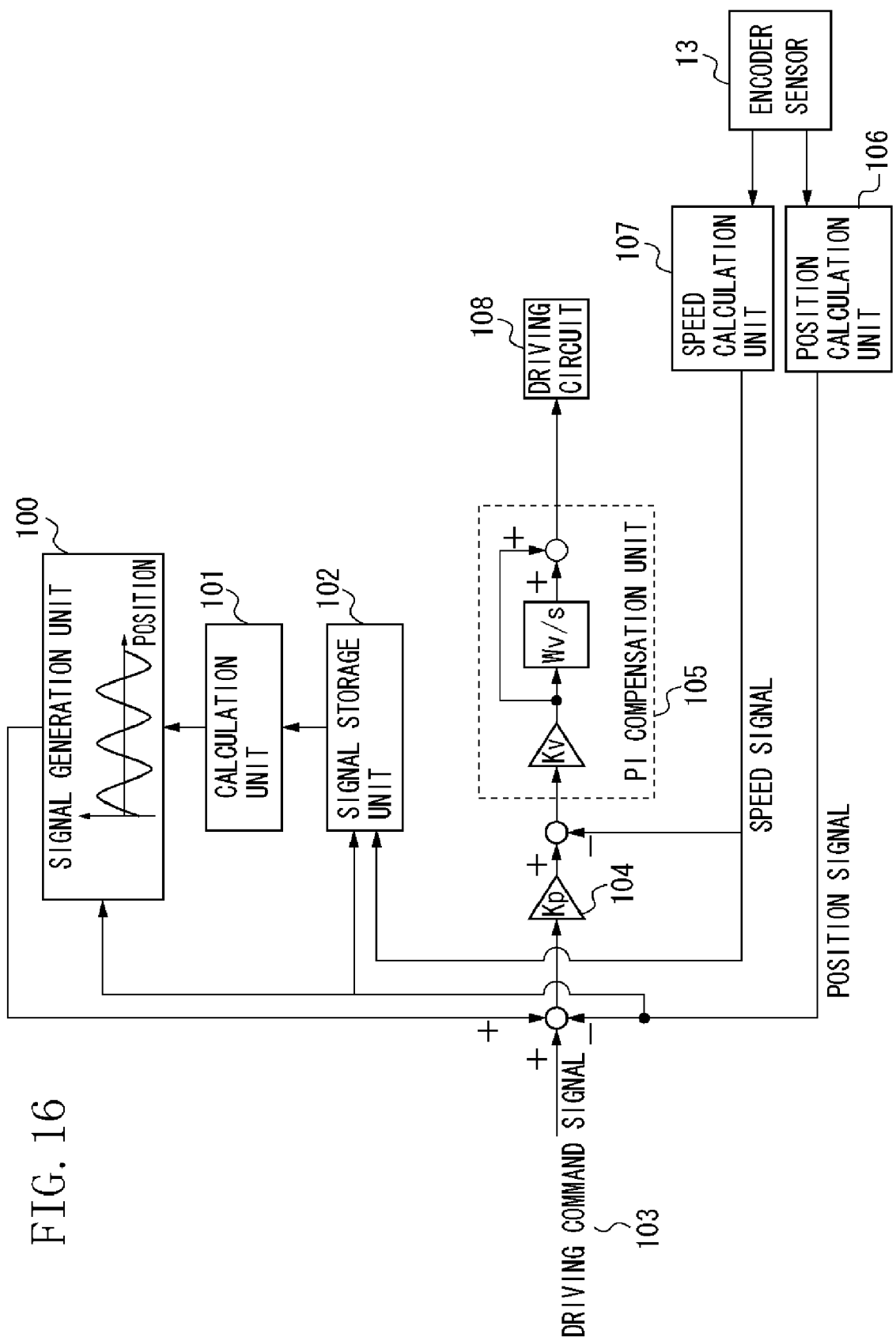
FIG. 16 illustrates the control configuration of the control unit in the ink jet recording apparatus according to another exemplary embodiment of the present invention.
Figure 17:
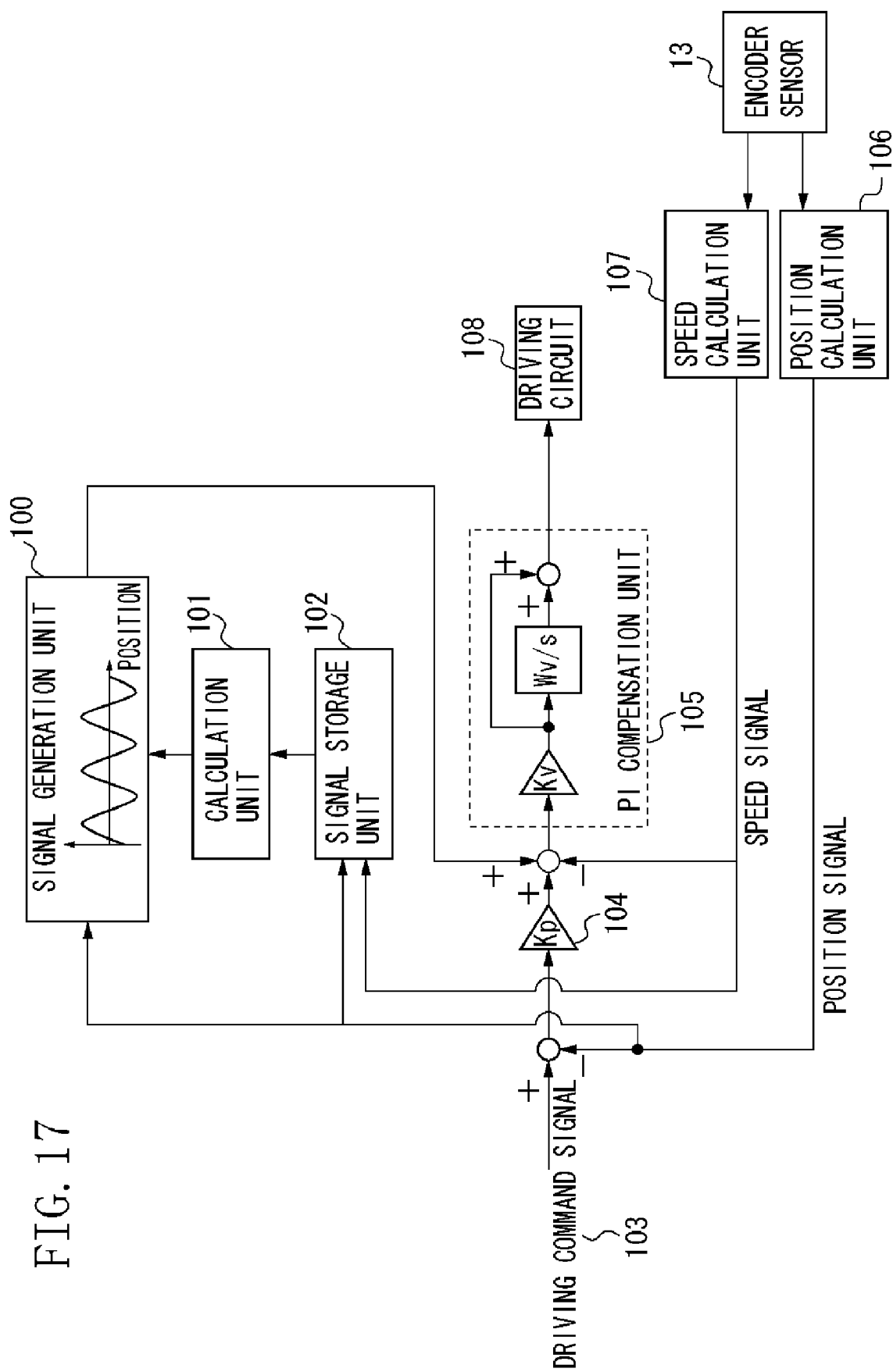
FIG. 17 illustrates the control configuration of the control unit in the ink jet recording apparatus according to another exemplary embodiment.

Two exemplary embodiments are described, however, the control configuration is not limited to the above-described exemplary embodiments. As illustrated in FIG. 16, the signal output from the signal generation unit 100 may be the command signal regarding the position. Further, as illustrated in FIG. 17, the signal output from the signal generation unit 100 may be the command signal regarding the speed.

The above-described exemplary embodiment describes the recording apparatus which causes the recording head to perform scanning to record data in the recording medium as one example of the mechanism. In addition to this embodiment, as another embodiment of the mechanism, the present invention may be applied to an image reading apparatus that includes a reading unit which performs scanning to read an original image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-333872 filed Dec. 26, 2008, which is hereby incorporated by reference herein in its entirety.

What is claimed is:

1. A method for controlling a motor which is used as a driving source in an apparatus that moves a mechanism by constant speed control, the method comprising:

performing a first preliminary drive by outputting a first driving signal to the motor to move the mechanism;

performing a second preliminary drive by outputting a second driving signal corresponding to a cogging period of the motor from a predetermined phase and the first driving signal to the motor, to move the mechanism;

determining a phase of the second driving signal for an actual drive when the output of the second driving signal is started, based on speeds acquired in the first and second preliminary drives;

performing a third preliminary drive by outputting the second driving signal from the determined phase to the motor and the first driving signal to the motor, to move the mechanism;

determining an amplitude of the second driving signal for an actual drive based on a speed acquired in the third preliminary drive; and executing the actual drive of the mechanism to perform predetermined processing by starting output of the second driving signal to the motor based on the determined phase and the determined amplitude as well as the first driving signal to the motor.

2. The method according to claim 1, further comprising starting output of the second driving signal when the mechanism moves to a predetermined position.

3. The method according to claim 1, further comprising acquiring speeds of the mechanism in the first and second preliminary drives in a predetermined movement range.

4. The method according to claim 3, further comprising acquiring a difference value between the acquired speeds of the first and second preliminary drives.

5. The method according to claim 4, further comprising determining the phase of the second driving signal when outputting of the second driving signal is started based on a phase corresponding to a minimum amount of the acquired difference value and a phase corresponding to a maximum value of the speed in the first preliminary drive.

6. The method according to claim 1, further comprising:
   outputting the second driving signal from a predetermined phase in each of a plurality of predetermined movement ranges in the second preliminary drive; and
   acquiring each speed of the first and second preliminary drives in the plurality of the movement ranges.

7. The method according to claim 6, further comprising acquiring an amplitude ratio between the speed variations in the acquired first preliminary drive and the acquired second preliminary drive in each movement range.

8. The method according to claim 7, further comprising determining the phase of the second driving signal when outputting of the second driving signal is started based on the acquired amplitude ratio.

9. A method for controlling a motor to move an object, the method comprising a preliminary operation to generate a correcting signal for an actual drive, the method comprising:
   performing a first preliminary drive to move the object by driving the motor with a driving signal;
   performing a second preliminary drive to move the object by driving the motor with the driving signal and a periodic signal, the periodic signal having a period corresponding to a cogging period of the motor;
   acquiring actual speed or positional information of the object in the first preliminary drive and in the second preliminary drive;
   determining phase information for the correcting signal based on the acquired information;
   performing a third preliminary drive to move the object by driving the motor with the driving signal and the periodic signal which reflects the determined phase information; and
   determining amplitude information for the correcting signal based on at least actual speed or positional information of the object in the third preliminary drive,
   the method further comprising generating the correcting signal, having a period corresponding to the cogging period, which reflects the determined phase information and the determined amplitude information, for the actual drive to move the object being executed after the preliminary operation.

10. The method according to claim 9, wherein the phase information includes a correction value of a phase of the periodic signal, and the amplitude information includes a correction value of an amplitude of the periodic signal.

11. A method for controlling a motor to move an object, the method comprising a preliminary operation to generate a correcting signal for an actual drive, the preliminary operation includes:
   performing a first preliminary drive to move the object by driving the motor with a driving signal;
   performing a second preliminary drive to move the object by driving the motor with the driving signal and a periodic signal, the periodic signal has a period corresponding to a cogging period of the motor;
   acquiring actual speed or positional information of the object in the first preliminary drive and in the second preliminary drive; and
   determining one or more parameters for the correcting signal for reducing an influence of a torque ripple of the motor based on the acquired information,
   the method further comprising generating the correcting signal, having a period corresponding to the cogging period, which reflects the determined one or more parameters, for the actual drive to move the object being executed after the preliminary operation.

12. The method according to claim 11, wherein the parameters includes one of the phase information and amplitude information for the correcting signal.

13. The method according to claim 11, further comprising acquiring speeds of the mechanism in the first and second preliminary drives within a predetermined range in a constant speed control region.

14. The method according to claim 11, wherein the speed or positional information is acquired by an encoder.

15. The method according to claim 11, wherein the object comprises a carriage mounting a recording head.

* * * * *